US008871702B2

(12) United States Patent
Morschhaeuser et al.

(10) Patent No.: US 8,871,702 B2
(45) Date of Patent: *Oct. 28, 2014

(54) SOIL-RELEASE POLYMERS HAVING A GREY-INHIBITING EFFECT AND HAVING HIGH STABILITY IN SOLUTION

(75) Inventors: Roman Morschhaeuser, Mainz (DE); Barbara Duecker, Mainz (DE); Hans Juergen Scholz, Alzenau (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 13/512,248

(22) PCT Filed: Nov. 24, 2010

(86) PCT No.: PCT/EP2010/007124
§ 371 (c)(1),
(2), (4) Date: Aug. 14, 2012

(87) PCT Pub. No.: WO2011/063944
PCT Pub. Date: Jun. 3, 2011

(65) Prior Publication Data
US 2012/0309665 A1 Dec. 6, 2012

(30) Foreign Application Priority Data

Nov. 27, 2009 (DE) .......................... 10 2009 056 127

(51) Int. Cl.
*B08B 3/04* (2006.01)
*C08G 63/672* (2006.01)
*C08G 63/688* (2006.01)
*C11D 3/00* (2006.01)
*C11D 3/37* (2006.01)

(52) U.S. Cl.
CPC .......... *C08G 63/6886* (2013.01); *C08G 63/672* (2013.01); *C11D 3/0036* (2013.01); *C11D 3/3715* (2013.01)
USPC ........... 510/475; 510/476; 510/477; 510/492; 510/505; 8/137

(58) Field of Classification Search
USPC ............... 510/475, 476, 477, 492, 505; 8/137
See application file for complete search history.

(56) References Cited

U.S. PATENT DOCUMENTS

| 3,128,287 A | 4/1964 | Berg |
| 3,159,581 A | 12/1964 | Diehl |
| 3,213,030 A | 10/1965 | Diehl |
| 3,332,880 A | 7/1967 | Kessler et al. |
| 3,400,148 A | 9/1968 | Quimby |
| 3,422,021 A | 1/1969 | Roy |
| 3,422,137 A | 1/1969 | Quimby |
| 3,635,830 A | 1/1972 | Lamberti et al. |
| 3,985,669 A | 10/1976 | Krummel et al. |
| 4,374,035 A | 2/1983 | Bossu |
| 4,427,557 A | 1/1984 | Stockburger |
| 4,566,984 A | 1/1986 | Bush |
| 4,605,509 A | 8/1986 | Corkill et al. |
| 4,663,071 A | 5/1987 | Bush et al. |
| 4,702,857 A | 10/1987 | Gosselink |
| 4,721,580 A | 1/1988 | Gosselink |
| 4,968,451 A | 11/1990 | Scheibel et al. |
| 5,142,020 A | 8/1992 | Kud et al. |
| 5,415,807 A | 5/1995 | Gosselink et al. |
| 5,599,782 A | 2/1997 | Pan et al. |
| 5,691,298 A | 11/1997 | Gosselink et al. |
| 6,537,961 B1 | 3/2003 | Koch |
| 2009/0036641 A1* | 2/2009 | Lang et al. .................. 528/295 |
| 2013/0200290 A1 | 8/2013 | Morschhaeuser et al. |

FOREIGN PATENT DOCUMENTS

| DE | 691 15 915 T2 | 8/1996 |
| DE | 197 35 715 A1 | 2/1999 |
| EP | 0 384 070 A2 | 8/1990 |
| EP | 0 442 101 B1 | 8/1991 |
| EP | 0 854 136 B1 | 7/1998 |
| EP | 1966273 | 3/2009 |
| GB | 1082179 | 9/1967 |
| JP | 51-136922 | 11/1976 |

(Continued)

OTHER PUBLICATIONS

JP 51136922 A2 (HCAPLUS-Abstract: AN 1977:107920).
JP 56026006 A2 (HCAPLUS-Abstract: AN 1981:426542).
The Journal of the American Oil Chemists Society 52 (1975), pp. 323 329.
German Patent Office Action for 10 2005 061 058.7-44, Aug. 30, 2006.
International Search Report for PCT/EP2006/011756 mail dated Feb. 27, 2007.
International Search Report for PCT/EP2010/007125 mail dated Feb. 21, 2011.

(Continued)

*Primary Examiner* — Brian P Mruk
(74) *Attorney, Agent, or Firm* — Tod A. Waldrop

(57) ABSTRACT

The invention relates to polyesters, obtainable by means of polymerization of the components including (a) one or more sulfo group-free aromatic dicarboxylic acids and/or salts thereof and/or anhydrides thereof and/or esters thereof, b) optionally one or more sulfo group-containing dicarboxylic acids, salts thereof and/or anhydrides thereof and/or esters thereof, c) 1,2-propylene glycol, d) ethylene glycol, e) one or more compounds of the formula (1) $R^1O(CHR^2CHR^3O)_nH$ (1), where $R^1$ is a linear or branched, saturated or unsaturated alkyl group having from 1 to 22 C atoms, $R^2$ and $R^3$, independently of one another, are hydrogen or an alkyl group having from 1 to 4 carbon atoms, and N is an integer of from 1 to 50, f) optionally one or more compounds of the formula (2) $H-(OCH_2CH_2)_m-SO_3X$ (2), in which m is an integer from 1 to 10 and X is hydrogen or an alkali metal ion, and g); optionally one or more crosslinking polyfunctional compounds, provided that at least one of the components b) or f) is present, and provided further that the molar ratio of the components c) 1,2-propylene glycol to d) ethylene glycol is greater than or equal to 1.70.

16 Claims, No Drawings

(56) References Cited

FOREIGN PATENT DOCUMENTS

| JP | 56-026006 | | 3/1981 | |
|---|---|---|---|---|
| WO | WO 91/17243 A1 | | 11/1991 | |
| WO | WO 95/02030 A1 | | 1/1995 | |
| WO | WO 03/012024 A1 | | 2/2003 | |
| WO | WO 2007/079850 | * | 7/2007 | ........... C08G 63/183 |
| WO | WO 2008/110318 | | 9/2008 | |

OTHER PUBLICATIONS

International Preliminary Report On Patentability for PCT/EP2010/007125 mail dated Jul. 12, 2012.
International Search Report for PCT/EP2010/007124 mail dated Feb. 21, 2011.
International Preliminary Report On Patentability for PCT/EP2010/007124 mail dated Jun. 14, 2012.
Abstract of WO2008110318, Sep. 18, 2008.

* cited by examiner

SOIL-RELEASE POLYMERS HAVING A GREY-INHIBITING EFFECT AND HAVING HIGH STABILITY IN SOLUTION

The invention relates to soil release polymers (=SRPs) in solid form, which feature very good water solubility, high hydrolysis stability and excellent solution stability.

The use of polyesters in washing compositions to improve soil detachment from textiles, to reduce restaining, to protect the fibers in the event of mechanical stress and to finish the fabric with an anticrease effect is known. A multitude of polyester types and the use thereof in washing and cleaning compositions are described in the patent literature.

U.S. Pat. No. 4,702,857 claims polyesters formed from ethylene glycol, 1,2-propylene glycol or mixtures thereof with high ethylene glycol contents, polyethylene glycol which has at least 10 glycol units and is capped at one end with a short-chain alkyl group, especially a methyl group, a dicarboxylic acid or ester and optionally alkali metal salts of sulfonated aromatic dicarboxylic acids.

U.S. Pat. No. 4,427,557 describes polyesters with molecular weights in the range from 2000 to 10 000 g/mol, prepared from the monomers ethylene glycol, polyethylene glycol with molecular weights of 200 to 1000 g/mol, aromatic dicarboxylic acids and alkali metal salts of sulfonated aromatic dicarboxylic acids and optionally from small amounts of aliphatic dicarboxylic acids, for example glutaric acid, adipic acid, succinic acid, glutaric acid, pimelic acid, suberic acid, azelaic acid, sebacic acid and 1,4-cyclohexanedicarboxylic acid, and emphasis is given to the anticrease effect and soil release effect thereof on polyester fabric or on polyester-cotton blend fabric.

U.S. Pat. No. 4,721,580 discloses polyesters with terephthalate units and sulfo-containing end groups, more particularly sulfoethoxylated end groups $MO_3S(CH_2CH_2O)_n$—H, and emphasizes the use thereof in washing compositions and fabric softeners.

U.S. Pat. No. 4,968,451 describes polyesters with sulfo-containing end groups, obtained by copolymerization of (meth)allyl alcohol, alkylene oxide, aryldicarboxylic acid and $C_2$-$C_4$-glycol, and subsequent sulfonation.

U.S. Pat. No. 5,691,298 claims polyesters as SRPs with a branched backbone composed of di- or polyhydroxysulfonate, terephthalate and 1,2-oxyalkyleneoxy units with nonionic or anionic end groups.

U.S. Pat. No. 5,415,807 states that soil release polymers with sulfonated polyethoxy/propoxy end groups tend to crystallize, which results in a reduction in the soil release effects.

EP 1 966 273 A1 and WO 2008/110318 A2 disclose SRPs formed from terephthalic acid, sulfoisophthalic acid and (poly)alkylene glycols which have a molar propylene glycol/ethylene glycol ratio of less than 1.7.

It was an object of the present invention to provide SRPs which exhibit a good graying inhibition effect for textiles, can be supplied as granules in free-flowing form, have good solubility in water, are stable to hydrolysis and substantially retain a mobile consistency in dissolved form, even in the case of prolonged storage.

It has been found that, surprisingly, the object of the invention is achieved by sulfo-containing polyesters below having a particular propylene glycol/ethylene glycol (PG/EG) ratio.

The invention therefore provides polyesters obtainable by polymerizing the components selected from a) one or more sulfo-free aromatic dicarboxylic acids and/or salts thereof and/or anhydrides thereof and/or esters thereof, b) optionally one or more sulfo-containing dicarboxylic acids, salts thereof and/or anhydrides thereof and/or esters thereof, c) 1,2-propylene glycol, d) ethylene glycol, e) one or more compounds of the formula (1)

$$R^1O(CHR^2CHR^3O)_nH \quad (1)$$

where $R^1$ is a linear or branched, saturated or unsaturated alkyl group having 1 to 22 carbon atoms, preferably $C_1$-$C_4$-alkyl, especially methyl, $R^2$ and $R^3$ are each independently hydrogen or an alkyl group having 1 to 4 carbon atoms, preferably hydrogen and/or methyl, and n is a number from 1 to 50, preferably 2 to 10, f) optionally one or more compounds of the formula (2)

$$H—(OCH_2CH_2)_m—SO_3X \quad (2)$$

where m is a number from 1 to 10 and

X is hydrogen or an alkali metal ion, and g) optionally one or more crosslinking polyfunctional compounds, with the proviso that at least one of components b) or f) is present, and with the further proviso that the molar ratio of components c) 1,2-propylene glycol to d) ethylene glycol is greater than or equal to 1.70.

Appropriately, the molar ratio of 1,2-propylene glycol (PG):ethylene glycol (EG) is 1.70 to 10.0, preferably 1.9 to 9.0, especially 2.0 to 8.0, more preferably 2.5 to 7.0 and most preferably 2.7 to 5.0.

Preference is given to polyesters obtainable by polymerizing components a) to g) in the following molar ratios, based on 1 mol of component a):

0 to 4 mol, preferably 0.1 to 2 mol, especially 0.2 to 1.5 mol and most preferably 0.3 to 1.1 mol of component b), 0.1 to 4 mol, preferably 0.5 to 3 mol, especially 0.6 to 2.5 mol and most preferably 0.8 to 1.5 mol of diol components c)+d), 0.1 to 4 mol, preferably 0.2 to 2 mol, especially 0.3 to 1.0 mol and most preferably 0.3 to 0.8 mol of component e), 0 to 4 mol, preferably 0.1 to 2 mol, especially 0.2 to 1.0 mol and most preferably 0.3 to 0.8 mol of component f), 0 to 0.2 mol, preferably 0 to 0.1 mol and especially 0 mol of component g), with the aforementioned provisos.

Preference is further given to polyesters obtainable by polymerizing components a) to g) in the following molar ratios, based on 1 mol of component a):

0.1 to 2 mol, especially 0.2 to 1.5 mol and most preferably 0.3 to 1.1 mol of component b), 0.5 to 4 mol, especially 0.6 to 3 mol and most preferably 0.8 to 2.5 mol of diol components c)+d), 0.1 to 4 mol, preferably 0.2 to 2 mol, especially 0.3 to 1.0 mol and most preferably 0.3 to 0.8 mol of component e), 0 mol of component f), 0 mol of component g), with the aforementioned provisos.

Preferred compounds of component a) are terephthalic acid, especially $C_1$-$C_4$-alkyl esters of terephthalic acid, for example dimethyl terephthalate, and isophthalic acid and $C_1$-$C_4$-alkyl esters of isophthalic acid.

Preferred compounds of component b) are 5-sulfoisophthalic acid, especially di($C_1$-$C_4$)alkyl 5-sulfoisophthalates and the alkali metal salts thereof, for example alkali metal salts of 5-sulfoisophthalic acid and dimethyl 5-sulfoisophthalate sodium salt or lithium salt.

Preferred compounds of component e) are singularly end-capped polyalkylene glycols (end stops), preferably poly[ethylene glycol-co-propylene glycol]monomethyl ethers having mean molecular weights of approx. 150 to 2000 g/mol, more preferably polyethylene glycol monomethyl ethers of the formula (1a)

$$CH_3-O-(C_2H_4O)_n-H \quad (1a)$$

where
n=2-10, preferably where n=3-5, especially where n=4.

Preferred compounds of component f) are those of the formula (2a)

$$H-(OCH_2CH_2)_m-SO_3X \quad (2a)$$

where
m is a number from 1 to 4, more preferably 1 or 2, and
X is hydrogen, sodium or potassium.

Preferred compounds of component g) are crosslinking polyfunctional compounds having 3 to 6 functional groups capable of an esterification reaction, for example acid, alcohol, ester, anhydride or epoxy groups. Different functionalities are also possible in one molecule. Preferred examples here include citric acid, malic acid, tartaric acid and gallic acid, more preferably 2,2-dihydroxymethylpropionic acid.

It is additionally possible to use polyhydric alcohols such as pentaerythritol, glycerol, sorbitol and trimethylolpropane.

Additionally preferred are polybasic aliphatic and aromatic carboxylic acids such as benzene-1,2,3-tricarboxylic acid (hemimellitic acid), benzene-1,2,4-tricarboxylic acid (trimellitic acid), more preferably benzene-1,3,5-tricarboxylic acid (trimesic acid).

The proportion by weight of component g), based on the total mass of the polyesters, is preferably 0 to 10% by weight, more preferably 0 to 5% by weight and especially preferably 0 to 3% by weight, most preferably 0% by weight.

The inventive polyesters generally have number-average molecular weights in the range from 700 to 50 000 g/mol, preferably from 800 to 25 000 g/mol, especially 1000 to 15 000 g/mol and more preferably 1200 to 12 000 g/mol. The number-average molecular weight is determined by means of size exclusion chromatography in aqueous solution using calibration with the aid of narrow-distribution polyacrylic acid Na salt standards.

All molecular weight figures in this document are based on the number-average molecular weight.

Moreover, the inventive polyesters may, in addition to the above-described components a) to g), comprise structural elements of an aliphatic dicarboxylic acid, preferably 1,4-cyclohexanedicarboxylic acid.

The proportion by weight of the aliphatic dicarboxylic acid used may be 1 to 15%, preferably 3 to 10% and more preferably 5 to 8%, based on the total amount of the monomers used.

The inventive polyesters are synthesized by processes known per se, by polycondensation of components a) to g). Appropriately, the abovementioned components are heated with addition of a catalyst, initially at standard pressure, to temperatures of 160 to approx. 220° C. using an inert atmosphere, preferably in the presence of a salt of a $C_1$-$C_3$-alkylcarboxylic acid, especially a dehydrated or partially hydrated sodium acetate $CH_3COONa \times (H_2O)_x$ where $x$ is a number in the range from 0 to 2.9, and where this salt is used in weights of 0.5 to 30%, preferably of 1 to 15%, more preferably of 3 to 8%, based on the total amount of the monomers used and the salt of the carboxylic acid. Then the required molecular weights are built up by distilling off overstoichiometric amounts of the glycols used under reduced pressure at temperatures of 160 to approx. 240° C. Suitable transesterification and condensation catalysts for the reaction are those known from the prior art, for example titanium tetraisopropoxide, dibutyltin oxide, alkali metal or alkaline earth metal alkoxides or antimony trioxide/calcium acetate.

In a preferred process for preparing the inventive polyesters, the condensation of the components is preformed in a one-pot process, with addition of the transesterification and condensation catalysts prior to heating.

The polyesters are obtained in the synthesis as a melt, which is solidified to flakes by cooling in a cool gas stream, for example an air or nitrogen stream, or preferably by application to a flaking roller or to a conveyor belt at 40 to 80° C., preferably at 45 to 55° C. This coarse material is appropriately ground to powder with particle sizes of 10 to 150 μm, which may optionally be followed by sieving for coarse particle removal.

Suitable grinding apparatus is a series of mills which preferably work by the principle of impact comminution. For example, hammer mills, pinned disk mills or jet mills are conceivable, these optionally being equipped with an integrated sifter to limit the upper particle size. The grinding fineness of the powder can be varied without difficulty, for example from d90.3=10 μm to d90.3=150 μm, by varying typical operating parameters (mill speed, throughput).

There are several possible methods for granulation:

In a preferred embodiment, the granulation is effected by compacting the ground powder, with or without addition of further additives. The compaction of the powder material with particle sizes d90.3=10 to 150 μm is preferably conducted on roll compactors (for example from Hosokawa-Bepex, Alexanderwerk, Koppern). Through the selection of the roller profile, it is possible to produce pellets or briquets on the one hand, and slugs on the other hand. The slugs are subsequently comminuted in a mill to granules of the desired particle size of approx. 100-1600 μm.

In a further preferred embodiment, the granulation proceeds from ground powder of defined fineness by means of buildup granulation in a mixer. The granulation of the polyesters, more particularly the granulation of the polyesters with additives, can be effected in customary mixing apparatuses which work batchwise or continuously and are generally equipped with rotating mixing tools. The mixers used may be apparatuses of moderate intensity, for example plowshare mixers (Lodige KM models, Drais K-T models), but also intensive mixers (for example Eirich, Schugi, Lodige CB models, Drais K-TT models). In a preferred embodiment, polyesters and additives are mixed simultaneously. However, multistage mixing operations are also conceivable, in which the polyesters and additives are introduced into the overall mixture in various combinations, individually or together with further additives. The sequence of slow and fast mixers can be switched as required. The residence times in the mixer granulation are preferably 0.5 s to 20 min, more preferably 2 s to 10 min.

In a further embodiment, the granulation is effected by shape granulation. An additive is added to the ground polyester powder, such that the mixture is present in homogeneous form as a plasticizable composition. The mixing step can be effected in the abovementioned mixing apparatuses, though kneaders or specific extruder types (e.g. Extrud-o-mix® from Hosokawa-Bepex Corp.) are also conceivable. The granulation mixture is subsequently pressed by means of tools through the die bores of a compression die, so as to form extrudates of cylindrical shape. Suitable apparatuses for the extrusion operation are preferably edge-runner presses (for example from Schlüter) or edge runners (for example from Amandus-Kahl), and if appropriate also extruders, in the form of a single-shaft machine (for example from Hosokawa-Bepex, Fuji-Paudal) or preferably of a twin-screw extruder (for example from Handle). The selection of the diameter of the die bore depends on the individual case and is typically in the range of 0.7-4 mm.

Preferred additives include anhydrous products, such as fatty alcohols, $C_8$-$C_{31}$ fatty alcohol polyalkoxylates with 1 to 100 moles of EO, $C_8$-$C_{31}$ fatty acids (e.g.: lauric acid, myristic acid, stearic acid), dicarboxylic acids, for example glutaric acid, adipic acid or anhydrides thereof, anionic or nonionic surfactants, waxes, silicones, anionic and cationic polymers, homopolymers, copolymers or graft copolymers of unsaturated carboxylic acids and/or sulfonic acids and the alkali metal salts thereof, cellulose ethers, starch, starch ethers, polyvinylpyrrolidone; mono- or polybasic carboxylic acids, hydroxycarboxylic acids or ether carboxylic acids each having 3 to 8 carbon atoms and salts thereof; and polyalkylene glycols. Useful polyalkylene glycols include polyethylene glycols, 1,2-polypropylene glycols, and modified polyethylene glycols and polypropylene glycols. The modified polyalkylene glycols include especially sulfates and/or disulfates of polyethylene glycols or polypropylene glycols with a relative molecular mass between 600 and 12 000 and especially between 1000 and 4000. A further group consists of mono- and/or disuccinates of the polyalkylene glycols, which again have relative molecular masses between 600 and 6000, preferably between 1000 and 4000. In addition, ethoxylated derivatives such as trimethylolpropane with 5 to 30 EO are also included.

Depending on the chemical properties, the additives can be used in solid form, as a melt or as aqueous solutions.

The polyester granules may contain 0 to 30% by weight of one or more of the additives mentioned, preferably 0 to 25% by weight, more preferably 0 to 20% by weight, based on the polyester granules.

The inventive polyesters can also be supplied as a mixture with hydrotropes from the group of the fatty alcohol sulfates, alkyl sulfates, α-olefinsulfonates, preference being given to alkylarylsulfonates and arylsulfonates, especially cumene-, toluene- and xylenesulfonates and mixtures thereof.

If present, the proportion of hydrotropes is appropriately from 0.1% to 15% percent by weight, preferably 1 to 10% by weight, based on the polyester solids.

The polyester granules are free-flowing and non-tacky, and can be brought into solution even in high concentrations in a simple manner and retain a mobile consistency in dissolved form, even in the case of prolonged storage. The time-dependent thickening process which frequently occurs in the case of storage of SRPs and extends up to gel-like or solid consistencies is very substantially absent or occurs only to a minor degree. Furthermore, the SRPs exhibit a strong graying inhibition effect on textiles.

The inventive polyesters impart significantly improved soil-detaching properties to the textile fibers. They substantially promote the soil detachment capacity of the other washing composition constituents with respect to oily, greasy or pigment stains, and prevent the deposition of particles from the wash liquor onto the textile (graying).

The inventive polyesters are characterized by a solubility in water with a German hardness of 3° at 20° C. of 10 to 50% by weight.

The advantage of these polyesters is that the solutions in concentrations of 10 to 50% by weight, in the case of storage at 20° C. to 45° C. over several months, have viscosities in the range from 100 to 8000 mPas, preferably 300 to 5000 mPas.

The inventive polyester granules can therefore also be incorporated into liquid washing and cleaning compositions in a simple manner.

The invention further provides for the use of the inventive polyesters in washing and cleaning compositions, in after-treatment compositions for the laundry, more particularly in a fabric softener, in textile care compositions and textile finishing compositions. The washing and cleaning composition formulations in which the inventive polyesters can be used are in the form of powders, granules, pastes, gels or liquids.

Examples thereof are heavy duty washing compositions, light duty washing compositions, color washing compositions, wool washing compositions, washing compositions for drapes, modular washing compositions, washing tablets, bar soaps, stain removers, laundry starches, fabric stiffeners, ironing aids.

The invention further provides solid washing and cleaning compositions comprising the above-described solid polyesters.

The invention further provides liquid washing and cleaning compositions comprising the above-described solid polyesters.

The inventive polyesters are surprisingly also notable for excellent runoff performance, especially in the washing of ceramic and glass. In the cleaning of hard surfaces made of stone, ceramic, glass, metal or plastic, the tendency to form lime deposits and the restaining of the treated surface are reduced, the adhesion of soil is made more difficult and the renewed cleaning of the surfaces is made easier.

The inventive polyesters can thus also be incorporated into domestic cleaning compositions, for example all-purpose cleaners, dishwasher detergents, rinse aids, carpet cleaning and impregnating compositions, cleaning and care compositions for floors and other hard surfaces, for example made from plastic, ceramic, glass, or surfaces coated with nanoparticles.

Examples of industrial cleaning compositions are plastic cleaning and care compositions, for instance for housings and automotive fittings, and cleaning and care compositions for painted surfaces, for instance car bodies.

The inventive washing and cleaning composition formulations contain at least 0.01% by weight, preferably between 0.1 and 10% by weight and more preferably 0.2 to 3% by weight of the inventive polyesters, based on the total weight of the washing and cleaning composition formulations.

The liquid washing and cleaning compositions preferably contain the inventive polyesters in amounts by weight of 0.05 to 5% by weight, preferably 0.1 to 3% by weight and more preferably 0.5 to 2.0% by weight, based on the total weight of the washing and cleaning composition formulations.

The solid washing and cleaning compositions preferably contain the inventive polyesters in amounts by weight of 0.1 to 5% by weight, preferably 0.5 to 3% by weight and more preferably 1.0 to 2.0% by weight, based on the finished compositions.

According to the envisaged use thereof, the composition of the formulations should be adapted to the nature of the textiles to be treated or washed, or of the surfaces to be cleaned.

The inventive washing and cleaning compositions may comprise standard ingredients, such as surfactants, emulsifiers, builders, bleach catalysts and activators, sequestrants, graying inhibitors, dye transfer inhibitors, dye fixatives, enzymes, optical brighteners and softening components. In addition, formulations or parts of the formulation can be selectively colored and/or perfumed by dyes and/or fragrances.

EXAMPLES

Polyester 1

A 1 l four-neck flask with precision glass stirrer, internal thermometer, gas inlet tube and distillation apparatus is initially charged with 227.9 g (3 mol) of 1,2-propanediol, 66.4 g (1.07 mol) of ethylene glycol, 72.9 g (0.35 mol) of tetraethylene glycol methyl ether, 291.3 g (1.50 mol) of dimethyl terephthalate and 148.1 g (0.5 mol) of dimethyl 5-sulfoisophthalate Na salt, and the reaction mixture is inertized by introducing $N_2$. Subsequently, 0.5 g of titanium tetraisopropoxide and 0.3 g of sodium acetate are added to the reaction mixture in an opposing gas flow. The mixture is heated to approx. 160° C. for approx. 15 to 20 minutes. The transesterification commences at this temperature; the methanol formed is distilled off.

During the distillation, the temperature is increased to 210° C. within 3 h. This is followed by cooling to 195° C. and reduction of the pressure to 10 mbar within 1 h. During the three-hour vacuum distillation, the condensation is completed by distilling off the excess amount of alcohol. The vacuum is reduced to 5 mbar for 5 minutes, followed by venting with $N_2$ and discharge of the melt onto metal sheets.

Polyester 2

A 1 l four-neck flask with precision glass stirrer, internal thermometer, gas inlet tube and distillation apparatus is initially charged with 210.6 g (2.77 mol) of 1,2-propanediol, 60.5 g (0.98 mol) of ethylene glycol, 145.8 g (0.7 mol) of tetraethylene glycol methyl ether, 291.3 g (1.50 mol) of dimethyl terephthalate and 148.1 g (0.5 mol) of dimethyl 5-sulfoisophthalate Na salt, and the reaction mixture is inertized by introducing $N_2$. Subsequently, 0.5 g of titanium tetraisopropoxide and 0.3 g of sodium acetate are added to the reaction mixture in an opposing gas flow. The mixture is heated to approx. 160° C. for approx. 15 to 20 minutes. The further procedure is as described in "Polyester 1".

Polyester 3

A 1 l four-neck flask with precision glass stirrer, internal thermometer, gas inlet tube and distillation apparatus is initially charged with 182.6 g (2.40 mol) of 1,2-propanediol, 84.5 g (1.36 mol) of ethylene glycol, 145.8 g (0.7 mol) of tetraethylene glycol methyl ether, 291.3 g (1.50 mol) of dimethyl terephthalate and 148.1 g (0.50 mol) of dimethyl 5-sulfoisophthalate Na salt, and the reaction mixture is inertized by introducing $N_2$. Subsequently, 0.5 g of titanium tetraisopropoxide and 0.3 g of sodium acetate are added to the reaction mixture in an opposing gas flow. The mixture is heated to approx. 160° C. for approx. 15 to 20 minutes. The further procedure is as described in "Polyester 1".

Polyester 4C

Comparative Example

A 1 l four-neck flask with precision glass stirrer, internal thermometer, gas inlet tube and distillation apparatus is initially charged with 233.0 g (3.75 mol) of ethylene glycol, 72.9 g (0.35 mol) of tetraethylene glycol methyl ether, 291.3 g (1.50 mol) of dimethyl terephthalate and 148.1 g (0.50 mol) of dimethyl 5-sulfoisophthalate Na salt, and the reaction mixture is inertized by introduction of $N_2$. Subsequently, 0.5 g of titanium tetraisopropoxide and 0.3 g of sodium acetate are added to the reaction mixture in an opposing gas flow. The mixture is heated to approx. 160° C. for approx. 15 to 20 minutes. The further procedure is as described in "Polyester 1".

TABLE 1

Solubility characteristics: 40% aqueous solution at 22° C.; viscosity values, determined immediately after the synthesis and after 28 days

| Polyester | Viscosity at 22° C. [mPas] on day 1 | Viscosity at 22° C. [mPas] on day 28 |
|---|---|---|
| 1 | 500 | 650, clear |
| 2 | 450 | 650, clear to opaque |
| 3 | 800 | lightly pasty after 17 days |
| 4C | firm | — |

Viscosity measurement, Brookfield spindle 2, 20 revolutions, 22° C.

The polyesters reported in table 2 are prepared analogously to example 1, and the viscosity is measured as described above. Examples 5C to 8C are comparative examples.

TABLE 2

| Polymer | DMT [mol] | 5-SIM [mol] | TetGME [mol] | EG [mol] | PG [mol] | Appearance, viscosity [mPas], day 1 | Appearance, viscosity [mPas], day x |
|---|---|---|---|---|---|---|---|
| 5C | 3 | 1 | 1 | 1 | 1.05 | Cloudy, 30 000 | Day 3, firm |
| 6C | 3 | 1 | 1 | 1 | 1.16 | Cloudy, 35 000 | Day 3, firm |
| 7C | 3 | 1 | 1 | 1 | 1.28 | Cloudy, 20 000 | Day 10, pasty |
| 8C | 3 | 1 | 1 | 1 | 1.42 | Slightly cloudy, 1000 | Day 17, pasty |
| 9C | 3 | 1 | 1 | 1 | 1.61 | Slightly cloudy, 1000 | Day 28, pasty |
| 10 | 3 | 1 | 1 | 1 | 1.97 | Clear, 200 | Day 28, slightly cloudy, liquid, 8000 |
| 11 | 3 | 1 | 1 | 1 | 2.22 | Clear, 190 | Day 28, slightly cloudy, liquid, 5200 |
| 12 | 3 | 1 | 1 | 1 | 2.50 | Clear, 340 | Day 28, clear to opaque, liquid, 5000 |
| 13 | 3 | 1 | 1 | 1 | 2.84 | Clear, 190 | Day 28, clear, liquid, 4500 |
| 14 | 3 | 1 | 1 | 1 | 5.36 | Slightly cloudy, 350 | Day 28, opaque, liquid, 6000 |

TABLE 2-continued

| Polymer | DMT [mol] | 5-SIM [mol] | TetGME [mol] | EG [mol] | PG [mol] | Appearance, viscosity [mPas], day 1 | Appearance, viscosity [mPas], day x |
|---|---|---|---|---|---|---|---|
| 15 | 3 | 1 | 1 | | 1 | 8.51 Cloudy, 580 | Day 28, slightly cloudy, liquid, 7500 |

DMT = dimethyl terephthalate
5-SIM = dimethyl 5-sulfoisophthalate Na salt
TetGME = tetraethylene glycol methyl ether
EG = ethylene glycol
PG = 1,2-propylene glycol Graying Inhibition Effect on Polyester Textile Fibers (Testex PES 730):

The polymers are added to the respective wash liquors in a concentration of 60 ppm (active ingredient), based on the test washing composition formulation (O). The wash liquors contain 6 g/l of formulation "O". 100 mg of an olive oil/gas black mixture are added to the wash liquor and dispersed in the wash liquor with stirring for 5 min. Subsequently, white polyester fabric Testex PES 730 (Testfabrics Inc., USA) is washed in the wash liquor thus conditioned at 20° C. for 20 minutes, at a water hardness of 15° dH H20/Ca:Mg=3:2.

After rinsing with fresh water 4 times, the test fabrics are first dried and then the whiteness thereof is determined with an Elrepho spectrophotometer and the reflectance is measured against an untreated Testex® PES 730 standard test fabric. Reflectance [%, 457 nm]/400 nm edge filter.

The reflectance refers to the whiteness of the used test fabric after washing compared to an untreated fabric (=100%). The closer the measurement (measured on an Elrepho spectrophotometer) is to 100%, the whiter is the test fabric analyzed and the more efficient is the polyester.

TABLE 3

| | Formulation "O" | Polyester 1 | Polyester 2 | Polyester 3 | Polyester 10 |
|---|---|---|---|---|---|
| Reflectance [%] | 69.4 | 84.9 | 85.1 | 81.1 | 78.4 |

Formulation (O):
Constituents in Percent by Weight:

| A | potash-coconut soap (27%) | 3% |
|---|---|---|
| B | 1,2-propanediol | 5% |
| C | Genapol LA-070 (Clariant) lauryl alcohol ethoxylate, 7EO | 4% |
| D | alkylbenzenesulfonate (Marlon A350/50%) | 17% |
| E | sodium cumenesulfonate | 0.5% |
| F | citric acid (30% solution) | 0.6% |
| G | water | ad 100 |
| pH: | | 7.5-7.6 |

The invention claimed is:

1. A polyester prepared by polymerizing components
a) at least one sulfo-free aromatic dicarboxylic acid, salt thereof, anhydride thereof, and/or ester thereof,
b) optionally at least one sulfo-containing dicarboxylic acid, salt thereof, anhydride thereof, and/or ester thereof,
c) 1,2-propylene glycol,
d) ethylene glycol,
e) at least one compound of the formula (1)

$$R^1O(CHR^2CHR^3O)_nH \qquad (1)$$

wherein
$R^1$ is a linear or branched, saturated or unsaturated alkyl group having 1 to 22 carbon atoms,
$R^2$ and $R^3$ are each independently hydrogen or an alkyl group having 1 to 4 carbon atoms, and
n is a number from 1 to 50,
f) optionally at least one compound of the formula (2)

$$H-(OCH_2CH_2)_m-SO_3X \qquad (2)$$

wherein
m is a number from 1 to 10 and
X is hydrogen or an alkali metal ion,
and
g) optionally at least one crosslinking polyfunctional compound,
with the proviso that at least one of components b) or f) is present, and with the further proviso that the molar ratio of components c) 1,2-propylene glycol to d) ethylene glycol is greater than or equal to 1.70.

2. The polyester as claimed in claim 1, wherein the molar ratio of 1,2-propylene glycol:ethylene glycol is 1.70 to 10.0.

3. The polyester as claimed in claim 1, wherein the molar ratio of 1,2-propylene glycol:ethylene glycol is 2.7 to 5.0.

4. The polyester as claimed in claim 1, prepared by polymerizing components a) to g) in the following molar ratios, based on 1 mol of component a):
0 to 4 mol of component b),
0.1 to 4 mol of the sum of components c)+d),
0.1 to 4 mol of component e),
0 to 4 mol of component f), and
0 to 0.2 mol of component g).

5. The polyester as claimed in claim 1, prepared by polymerizing components a) to g) in the following molar ratios, based on 1 mol of component a):
0.1 to 2 mol of component b),
0.5 to 4 mol of the sum of components c)+d),
0.1 to 4 mol of component e),
0 mol of component f), and
0 mol of component g).

6. The polyester as claimed in claim 1, wherein component a) is a compound selected from the group consisting of terephthalic acid, $C_1$-$C_4$-alkyl esters of terephthalic acid, isophthalic acid and $C_1$-$C_4$-alkyl esters of isophthalic acid.

7. The polyester as claimed in claim 1, wherein component b) is a compound selected from the group consisting of 5-sulfoisophthalic acid, alkali metal salts of 5-sulfoisophthalic acid, di($C_1$-$C_4$)alkyl 5-sulfoisophthalates and di($C_1$-$C_4$-alkyl) 5-sulfoisophthalate alkali metal salts.

8. The polyester as claimed in claim 1, wherein component e) is a polyethylene glycol monomethyl ether of the formula (1a)

$$CH_3-O-(C_2H_4O)_n-H \qquad (1a)$$

where n=2 to 10.

9. A process for producing the polyester as claimed in claim 1, comprising the step of the polycondensation of components a) to g).

10. A washing and cleaning composition, a fabric softener, a textile care composition or a textile finishing composition comprising at least one polyester according to claim 1.

11. A soil release polymer comprising at least one polyester according to claim 1.

12. A solid washing or cleaning composition comprising at least one polyester as claimed in claim 1.

13. A liquid washing or cleaning composition comprising at least one polyester as claimed in claim 1.

14. The washing or cleaning composition as claimed in claim 12, comprising 0.1 to 10% by weight of the polyester, based on the total weight of the washing or cleaning composition.

15. The washing or cleaning composition as claimed in claim 13, comprising 0.1 to 10% by weight of the polyester, based on the total weight of the washing or cleaning composition.

16. A process for counteracting the graying of textiles comprising the step of contacting the textiles with a washing and cleaning composition, a fabric softener, a textile care composition or a textile finishing composition according to claim 10.

* * * * *